(12) United States Patent
Chen (10) Patent No.: US 8,194,707 B2
(45) Date of Patent: Jun. 5, 2012

(54) METHOD AND SYSTEM FOR DYNAMICALLY ALLOCATING VIDEO MULTIPLEXING BUFFER BASED ON QUEUING THEORY

(75) Inventor: Xuemin Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1683 days.

(21) Appl. No.: 11/068,700

(22) Filed: Feb. 28, 2005

(65) Prior Publication Data
US 2006/0193350 A1 Aug. 31, 2006

(51) Int. Cl.
H04J 3/02 (2006.01)
H04J 3/14 (2006.01)
H04L 1/00 (2006.01)
H04L 12/26 (2006.01)
H04L 12/28 (2006.01)
H04L 12/56 (2006.01)

(52) U.S. Cl. .................. 370/537; 370/235; 370/412

(58) Field of Classification Search .......... 370/235, 370/412, 537
See application file for complete search history.

(56) References Cited

U.S. PATENT DOCUMENTS

| 5,619,492 | A * | 4/1997 | Press et al. | 370/441 |
|---|---|---|---|---|
| 5,862,126 | A * | 1/1999 | Shah et al. | 370/395.21 |
| 6,292,493 | B1 * | 9/2001 | Campbell et al. | 370/445 |
| 6,781,991 | B1 * | 8/2004 | Anderlind | 370/394 |
| 6,859,496 | B1 * | 2/2005 | Boroczky et al. | 375/240.26 |
| 6,956,901 | B2 * | 10/2005 | Boroczky et al. | 375/240.03 |
| 7,103,595 | B2 * | 9/2006 | Anastasiadis et al. | 707/7 |
| 2001/0047423 | A1 * | 11/2001 | Shao et al. | 709/235 |
| 2006/0171418 | A1 * | 8/2006 | Casini et al. | 370/474 |
| 2006/0193350 | A1 * | 8/2006 | Chen | 370/537 |
| 2007/0200727 | A1 * | 8/2007 | Sakamoto | 340/825.25 |
| 2008/0044156 | A1 * | 2/2008 | Sugahara et al. | 386/52 |
| 2008/0044157 | A1 * | 2/2008 | Sugahara et al. | 386/52 |
| 2009/0010614 | A1 * | 1/2009 | Yahata et al. | 386/96 |
| 2009/0252231 | A1 * | 10/2009 | Tahara et al. | 375/240.23 |

OTHER PUBLICATIONS

Queueing Theory Basics (http://web.archive.org/web/20040822015628/http://www.eventhelix.com/realtimemantra/CongestionControl/queueing_theory.htm.*
Encyclopedia of Computer Science and Technology (Hardcover); Allen Kent et al., CRC Press; 1 edition (Jul. 9, 1997).*
Soldatos et al. (Computer Networks 34, (2000) pp. 65-83, hereinafter Soldatos.*

* cited by examiner

*Primary Examiner* — Ronald Abelson (74) *Attorney, Agent, or Firm* — Thomas, Kayden, Horstemeyer & Risley LLP.

(57) ABSTRACT

An embodiment of the invention may provide a method for predicting buffer size in a system, where multiple encoded bit streams may be multiplexed into a single bit stream. The multiple encoded bit streams may comprise either a constant or a variable rate. Notwithstanding, predicting the buffer size required for encoding, multiplexing and/or decoding prevents overflow and underflow of the buffer. At the demultiplexer, each decoder may have a buffer and there may not be any buffering prior to multiplexing. A plurality of MPEG encoded data bit streams may be multiplexed into a single multiplexed MPEG encoded data bit stream. A size of buffers utilized to buffer the multiplexed MPEG encoded data bit stream may be determined based on a queuing model.

27 Claims, 4 Drawing Sheets

METHOD AND SYSTEM FOR DYNAMICALLY ALLOCATING VIDEO MULTIPLEXING BUFFER BASED ON QUEUING THEORY

CROSS-REFERENCE TO RELATED APPLICATIONS/INCORPORATION BY REFERENCE

Not applicable.

FIELD OF THE INVENTION

Certain embodiments of the invention relate to queuing theory. More specifically, certain embodiments of the invention relate to a method and system for dynamically allocating video multiplexing buffer based on queuing theory.

BACKGROUND OF THE INVENTION

In digital video services such as satellite or cable digital television, video and audio encoders may be co-located while the associated decoders may or may not be co-located. In these applications, a fixed number of different video channels may be encoded and transmitted together, and bit-rate for each channel may be controlled by a central multiplexing unit.

The MPEG-1, MPEG-2 and MPEG-4 audio and video coding standards may support various multiplexing mechanisms for combining bit streams from up to, for example, 32 audio, 16 video, many video objects and any number of auxiliary streams. The channel rates utilized for transmission or retrieval from storage are not limited to being constant, but may also be variable. Transmission of bit streams may occur across a leased line or across a packet-switched public network, for example. Retrieval of bit streams may be from a DVD ROM database with a bursty data rate, for example. However, implementation architectures of multiplexing may not be provided in these standards.

When multiple streams of data are multiplexed, it may be essential that data is not lost by encoder and/or decoder buffer overflow or underflow. One obvious solution to this problem may involve increasing a buffer size of the buffers that are utilized in the system. However, increasing the buffer size in the system may be cost prohibitive, especially for low-cost transcoders. Additionally, data may be lost if the system has a variable transmission or retrieval rate. Therefore, it may be desirable to have a systematic approach to predict for preventing, for example, loss of data by encoder and/or decoder overflow and/or underflow for a given application.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for dynamic allocating video multiplexing buffer based on queuing theory, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

An embodiment of the invention may provide a method for predicting buffer size in a system, where multiple encoded bit streams may be multiplexed into a single bit stream. The multiple encoded bit streams may comprise either a constant or a variable rate. Notwithstanding, predicting the buffer size required for encoding, multiplexing and/or decoding prevents overflow and underflow of the buffer. To facilitate editing of the stored multiplexed streams, parts of the individual streams that were generated during the same time interval may be constant and known prior to multiplexing. At the demultiplexer, each decoder may have a buffer and there may not be any buffering prior to multiplexing. A rate control mechanism may be utilized at the encoder to prevent overflow and underflow of encoder and/or decoder buffers.

Figure 1:
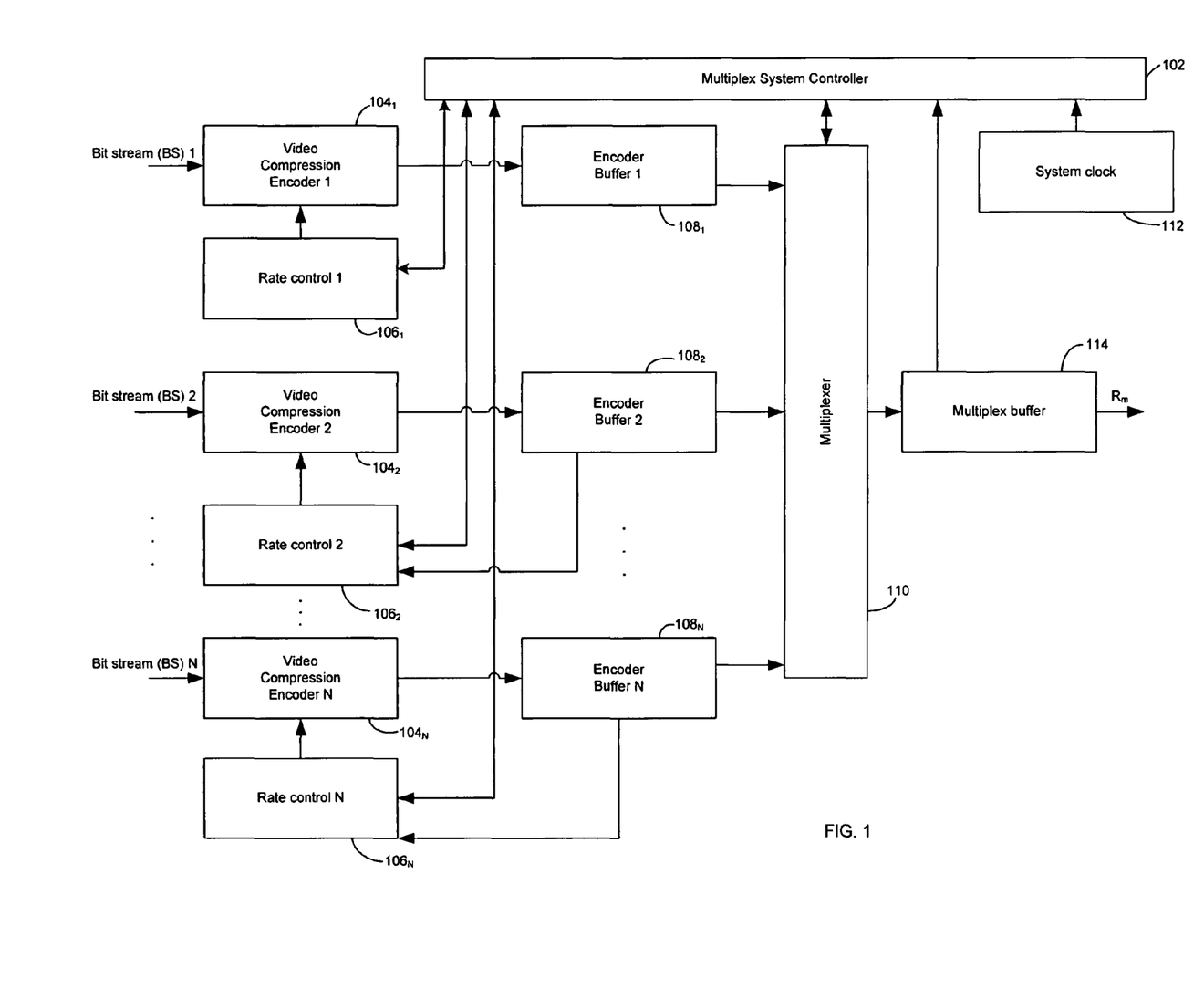
FIG. 1 is a block diagram of an exemplary multiplexing system for integrating multiple encoded bit streams into a single bit stream, in accordance with an embodiment of the invention.

FIG. 1 is a block diagram of an exemplary multiplexing system for integrating multiple encoded bit streams into a single bit stream, in accordance with an embodiment of the invention. Referring to FIG. 1, there is shown a multiplex system controller 102, a plurality of video compression encoders $104_{1 \ldots N}$, a plurality of rate control blocks $106_{1 \ldots N}$, a plurality of encoder buffers $108_{1 \ldots N}$, a multiplexer 110, a system clock 112 and a multiplex buffer 114.

The multiplex system controller 102 may comprise suitable logic, circuitry and/or code that may be adapted to control the multiplexer 110 to transfer designated packets of data from the plurality of encoder buffers $108_{1 \ldots N}$ to the multiplex buffer 114, while they await transmission to the channel. The multiplex system controller 102 may also be adapted to control the plurality of rate control blocks $106_{1 \ldots N}$ to control the bit rate of the plurality of video compression encoders $104_{1 \ldots N}$.

The plurality of video compression encoders $104_{1 \ldots N}$ may comprise suitable logic, circuitry and/or code that may be adapted to receive a plurality of bit streams $BS_{1 \ldots N}$ and may generate a plurality of encoded bit streams to a plurality of encoder buffers $108_{1 \ldots N}$. The plurality of rate control blocks $106_{1 \ldots N}$ may comprise suitable logic, circuitry and/or code that may be adapted to control the bit rate of the plurality of video compression encoders $104_{1 \ldots N}$. The plurality of rate control blocks $106_{1 \ldots N}$ may be adapted to receive a plurality of signals from the plurality of encoder buffers $108_{1 \ldots N}$ and the multiplex system controller 102. The plurality of rate control blocks $106_{1 \ldots N}$ may be adapted to generate a plurality of control signals to the plurality of video compression encoders $104_{1 \ldots N}$ to control the bit rate. A start time and an end time of each access unit as well as a number of bits generated during coding may be monitored by the plurality of encoder rate control blocks $106_{1...N}$. The monitored start and end times may be communicated to the multiplex system controller 102 by the encoder rate control blocks $106_{1...N}$.

The plurality of encoder buffers $108_{1...N}$ may comprise suitable logic, circuitry and/or code that may be adapted to receive a plurality of encoded bit streams from the plurality of video compression encoders $104_{1...N}$ and transfer designated packets of data to the multiplex buffer 114 under control of the multiplex system controller 102. The multiplexer 110 may comprise suitable logic, circuitry and/or code that may be adapted to receive a plurality of designated packets of data from the plurality of encoder buffers $108_{1...N}$ and transfer a multiplexed packet of data to the multiplex buffer 114. The system clock 112 may comprise suitable logic, circuitry and/or code that may be adapted to control the transfer of the plurality of bit streams of data. The transmitted bit stream may also comprise timing information in the packet header data, for example, to enable the demultiplexing system to track the packet of data accurately.

The multiplex buffer 114 may comprise suitable logic, circuitry and/or code that may be adapted to receive designated packets of data from multiple encoded bit streams from the plurality of encoder buffers $108_{1...N}$ under the control of the multiplex system controller 102 and generate a single bit stream of rate $R_m$ bits/second, for example. The multiplex buffer 114 may generate a signal to the multiplex system controller 102 when the buffer is full.

In operation, a plurality of bit streams $BS_{1...N}$ may be received by the plurality of video compression encoders $104_{1...N}$. Each bit stream may comprise a sequence of access units. For video, an access unit may comprise the bits necessary to represent a single coded picture, for example, a frame in MPEG-1, MPEG-2, MPEG-4 advanced video coding or a video object plane in MPEG-4 video. For audio, an access unit may comprise a block of audio samples. Each stream may be assigned a nominal average bit rate and each encoder may be adapted to operate near its assigned bit rate. Burstiness of data may be allowed if there is sufficient channel capacity. However, the buffer may overflow if many sources transmit above their assigned rates for a long time.

The first bit stream, $BS_1$ may comprise access units that may enter the first video compression encoder (VEC) $104_1$. The first bit stream $BS_1$ may be encoded into one or more packets of data and transferred to encoder buffer 1 $108_1$. The start and end times of each access unit and the number of bits generated during coding may be monitored by encoder rate control 1 block $106_1$ and passed to the multiplex system controller 102. The encoder rate control 1 block $106_1$ may also be adapted to monitor the encoder buffer capacity and utilize this information to control the bit rate of video compression encoder $104_1$. Coded packets comprising a variable number of bits may be sent from the video compression encoder $104_1$ to encoder buffer 1.

The packets of data from various streams may be multiplexed together to form multiplexed blocks of data. Under control of the multiplex system controller 102, the multiplexer 110 may be adapted to transfer designated packets of data from the plurality of encoder buffers $108_{1...N}$ to the multiplex buffer 114, while they await transmission to the channel. The transfer of packets from the plurality of encoder buffers $108_{1...N}$ to the multiplex buffer 114 may require a fraction of a packet duration, so that a subsequent block may be coded without a risk of encoder buffer overflow.

Figure 2:
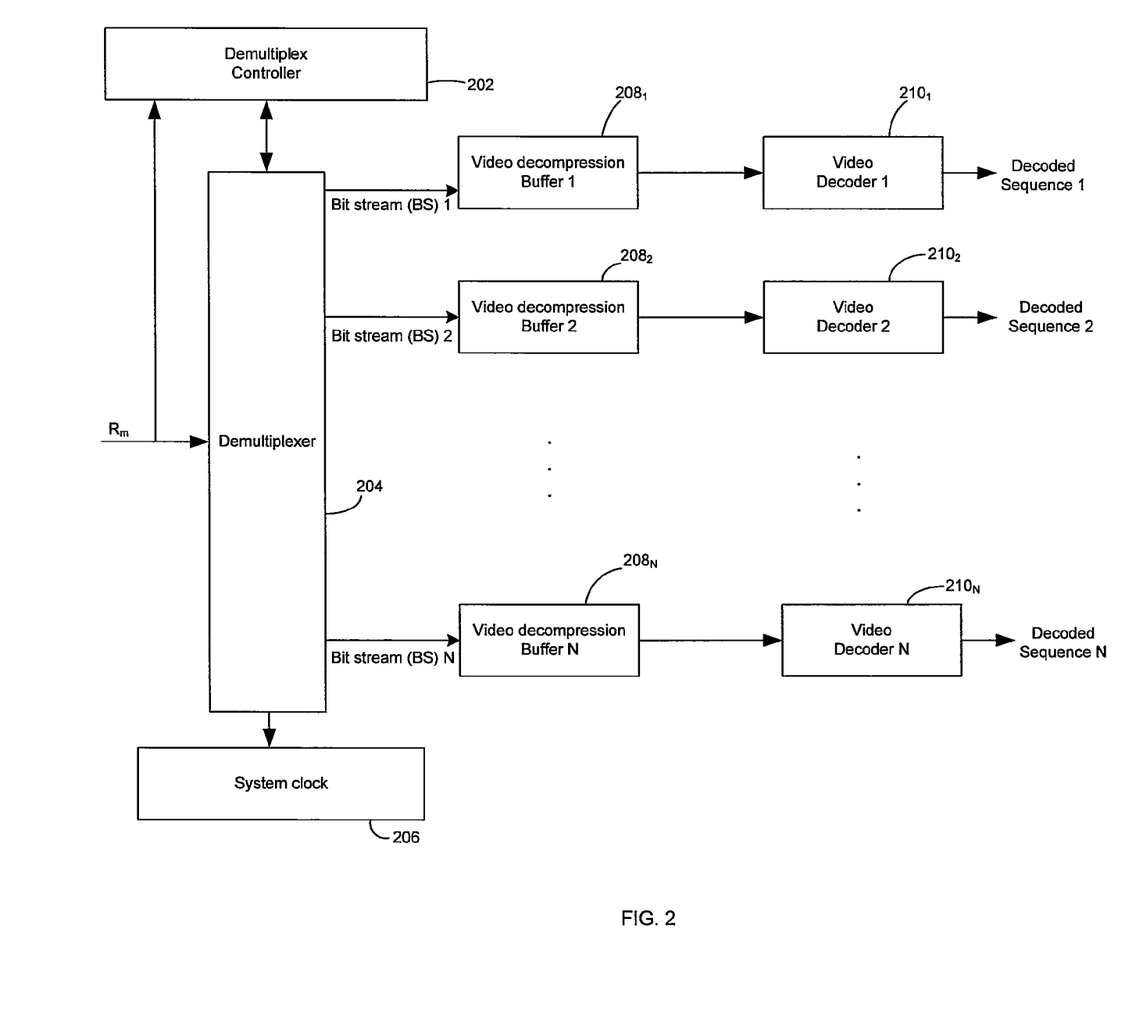
FIG. 2 is a block diagram of an exemplary system for demultiplexing a single bit stream into multiple decoded bit streams, in accordance with an embodiment of the invention.

FIG. 2 is a block diagram of an exemplary system for demultiplexing a single bit stream into multiple decoded bit streams, in accordance with an embodiment of the invention.

Referring to FIG. 2, there is shown a demultiplex controller 202, a demultiplexer 204, a system clock 206, a plurality of video decompression buffers (VDB) $208_{1...N}$ and a plurality of video decoders $210_{1...N}$.

The demultiplex controller 202 may comprise suitable logic, circuitry and/or code that may be adapted to identify the incoming packets of data to determine which bit stream they may belong to and pass them to the respective video decompression buffers $208_{1...N}$. The demultiplexer 204 may comprise suitable logic, circuitry and/or code that may be adapted to receive a bit stream with a bit rate $R_m$ bits/second, for example, and demultiplex the single bit stream into N bit streams, for example. The system clock 206 may comprise suitable logic, circuitry and/or code that may be adapted to control transfer of the plurality of bit streams of data. The received bit stream may comprise timing information in the packet header data, for example, to enable the demultiplexing system to track the packet of data accurately.

The plurality of video decompression buffers (VDB) $208_{1...N}$ may comprise suitable logic, circuitry and/or code that may be adapted to receive a plurality of bit streams $BS_{1...N}$ and generate a plurality of decompressed bit streams to the plurality of video decoders $210_{1...N}$. The plurality of video decoders $210_{1...N}$ may comprise suitable logic, circuitry and/or code that may be adapted to receive a plurality of decompressed bit streams from the plurality of video decompression buffers $208_{1...N}$ and generate a plurality of decoded sequences 1 ... N.

The demultiplex controller 202 may be adapted to identify the incoming packets from the channel to determine which stream they belong to and may pass them to the video decompression buffers $208_{1...N}$. Each video decoder $210_{1...N}$ may be adapted to wait for a certain period of time after the arrival of the first bit of information from the channel before starting to decode. This delay may ensure that for any given access unit, the decoder has received all the bits for that access unit in time for that access unit to be displayed. The video decompression buffers $208_{1...N}$ may be underrun if the necessary delay is not provided.

Timing information may be extracted by the demultiplex controller 202 and may be fed to the system clock 206, which may generate a clock signal. Decoding and presentation timing information may also be included in the individual data streams by the video compression encoders $104_{1...N}$ (FIG. 1), to be utilized later by the plurality of video decoders $210_{1...N}$ for synchronization of audio, video and/or other data. In the absence of such timing information, satisfactory performance may result if each decoder waits for a certain fixed delay after the arrival of the bit stream of information from the channel before starting to decode.

In accordance with an embodiment of the invention, each individual encoder rate control block $106_{1...N}$ (FIG. 1) may be adapted to guarantee that its encoder buffer $108_{1...N}$ (FIG. 1) may not overflow and its video decompression buffer $208_{1...N}$ neither overflows nor underflows. Additionally, the encoder rate control block $106_{1...N}$ (FIG. 1) may be adapted to guarantee that the combination of the encoder buffers $108_{1...N}$ and the multiplex buffer 114 may not overflow and no video decompression buffer $208_{1...N}$ underflows.

Figure 3:
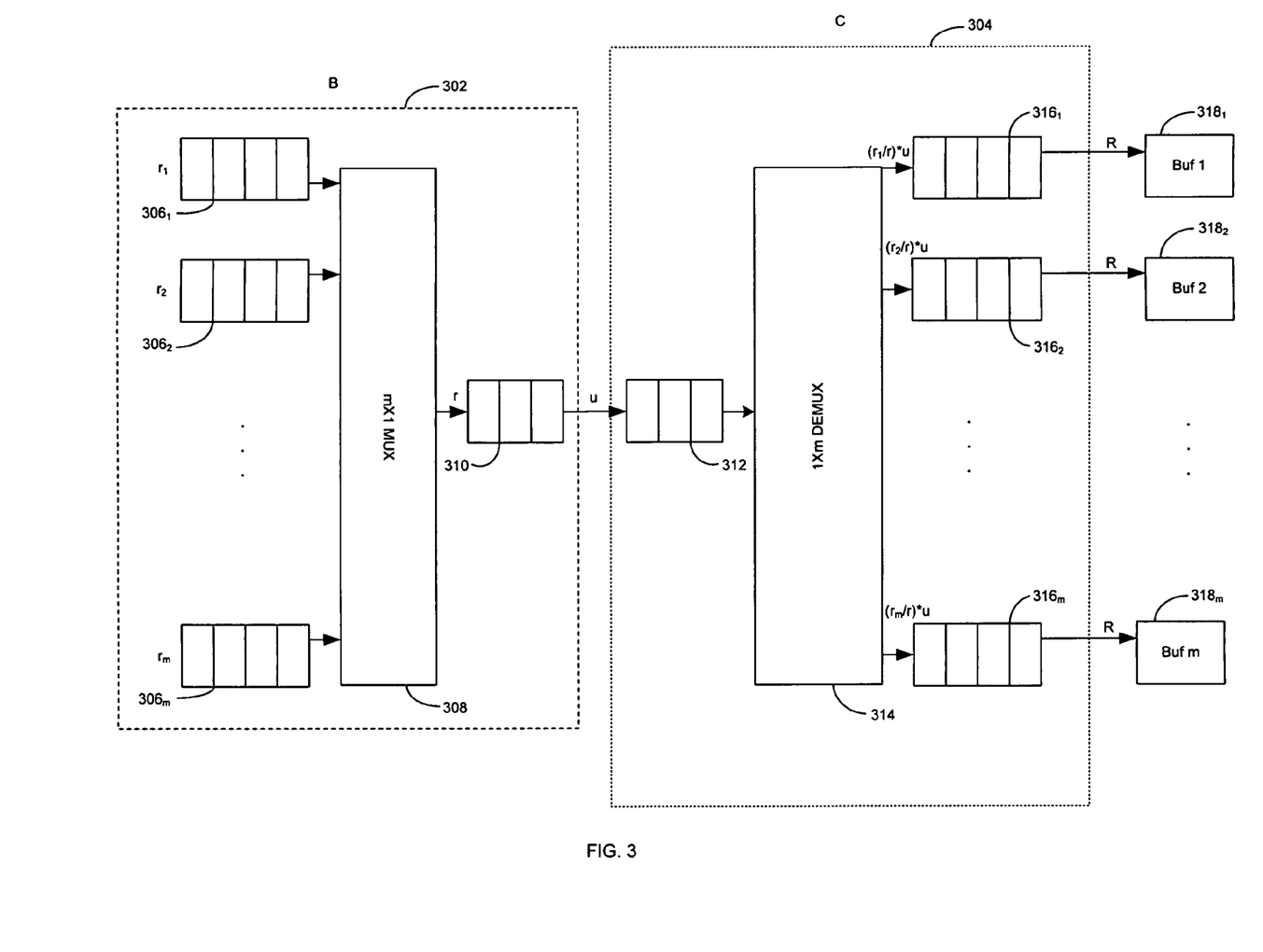
FIG. 3 is a block diagram of an exemplary system illustrating dynamic allocating video multiplexing buffer based on queuing theory, in accordance with an embodiment of the invention.

FIG. 3 is a block diagram of an exemplary system illustrating dynamically allocating video multiplexing buffer based on queuing theory, in accordance with an embodiment of the invention. Referring to FIG. 3, there is shown an encoder B 302, a decoder C 304 and a plurality of decoder buffers $318_{1...m}$. The encoder B 302 may comprise a plurality of encoder buffers $306_{1...m}$, a multiplexer 308 and a multiplex buffer 310. The decoder C 304 may comprise a demultiplex buffer 312, a demultiplexer 314 and a plurality of video decoders 316$_{1 \ldots m}$.

The plurality of encoder buffers 306$_{1 \ldots m}$ may comprise suitable logic, circuitry and/or code that may be adapted to receive a plurality of encoded bit streams with bit rates $r_{1 \ldots m}$ bits/second from a plurality of video compression encoders and transfer designated packets of data to the multiplex buffer 310. The multiplexer 308 may comprise suitable logic, circuitry and/or code that may be adapted to receive a plurality of encoded bit streams with bit rates $r_{1 \ldots m}$ bits/second from a plurality of encoder buffers 306$_{1 \ldots m}$ and generate a single bit stream with bit rate r bits/second. The multiplex buffer 310 may comprise suitable logic, circuitry and/or code that may be adapted to receive designated packets of data from multiple encoded bit streams from the plurality of encoder buffers 306$_{1 \ldots m}$ under the control of a multiplex system controller and generate a single bit stream of rate r bits/second, for example.

The demultiplex buffer 312 may comprise suitable logic, circuitry and/or code that may be adapted to receive a single bit stream with mean arrival rate μ and feed it to the demultiplexer 314. The demultiplexer 314 may comprise suitable logic, circuitry and/or code that may be adapted to receive a single bit stream with a bit rate r bits/second, for example, and demultiplex the single bit stream into m bit streams with bit rates $(r_{1 \ldots m}/r)*\mu$ bits/second, for example. The plurality of video decoders 316$_{1 \ldots m}$ may comprise suitable logic, circuitry and/or code that may be adapted to receive a plurality of bit streams with bit rates $(r_{1 \ldots m}/r)*\mu$ bits/second and generate a plurality of decoded bit streams with bit rate R bits/second. The plurality of decoder buffers 318$_{1 \ldots m}$ may comprise suitable logic, circuitry and/or code that may be adapted to receive a plurality of decoded bit streams with bit rate R bits/second.

The multiplexing system described in FIG. 1 and the demultiplexing system described in FIG. 2 may be modeled as 2 M/D/1 queuing systems B and C as shown in FIG. 3, where M may designate a Poisson arrival process, D may designate that the service time or processing time for each processing unit in the branch may be deterministic and 1 may indicate one multiplexer or demultiplexer. The inter-arrival times of processing units in each branch may be independent, identically distributed (IID) exponential random variables.

It may be assumed that m=N input bit streams of equal length packets may arrive according to an independent Poisson process with bit rates $r_1, r_2 \ldots r_m$ into the encoder B 302 and generate a multiplexed stream with rate $r=r_1+r_2+\ldots+r_m$. The multiplexer 308 service times may be identical for all packets in all streams and may be equal to 1/μ. The demultiplexer 314 may be adapted to send data to the plurality of video decoders 316$_{1 \ldots m}$ with bit rate $(r_i/r)*\mu$ bits/second, where i=1 . . . m. Each video decoder 316$_{1 \ldots m}$ may have a processing rate R bits/second.

According to the M/D/1 queuing system, the total delay for encoder B may be calculated as $$T_B = X + \frac{r*X^2}{2\left(1 - \frac{r}{\mu}\right)},$$

where $X=1/\mu$ and $r/\mu<1$ $$T_B = \frac{1}{\mu} + \frac{r/\mu^2}{2\left(1 - \frac{r}{\mu}\right)} = \frac{2\mu - r}{2\mu(\mu - r)}$$

The total delay for each branch of decoder C may be calculated as $T_C$, $$T_C = X + \frac{\frac{r_i}{r}*\mu*X^2}{2\left(1 - \frac{r_i*\mu}{r*R}\right)},$$

where $X=1/R$, $r_i*\mu<R*r$ and i=1 . . . m.

$$T_C = \frac{1}{R} + \frac{\frac{r_i}{r}*\mu*1/R^2}{2\left(1 - \frac{r_i*\mu}{r*R}\right)}$$

$$T_C = \frac{1}{R} + \frac{r_i*\mu}{2R(rR - r_i\mu)}$$

For given peak bit rates $r_1, r_2 \ldots r_m$, the total delay for encoder B, $T_B$, may be utilized to estimate the required buffer size, for example, $T_B/r$ for the encoder B 302. Similarly, the total delay for each branch of decoder C, $T_C$, may be utilized to estimate the required buffer size, for example, $T_C/\mu$ for the decoder C 304.

Figure 4:
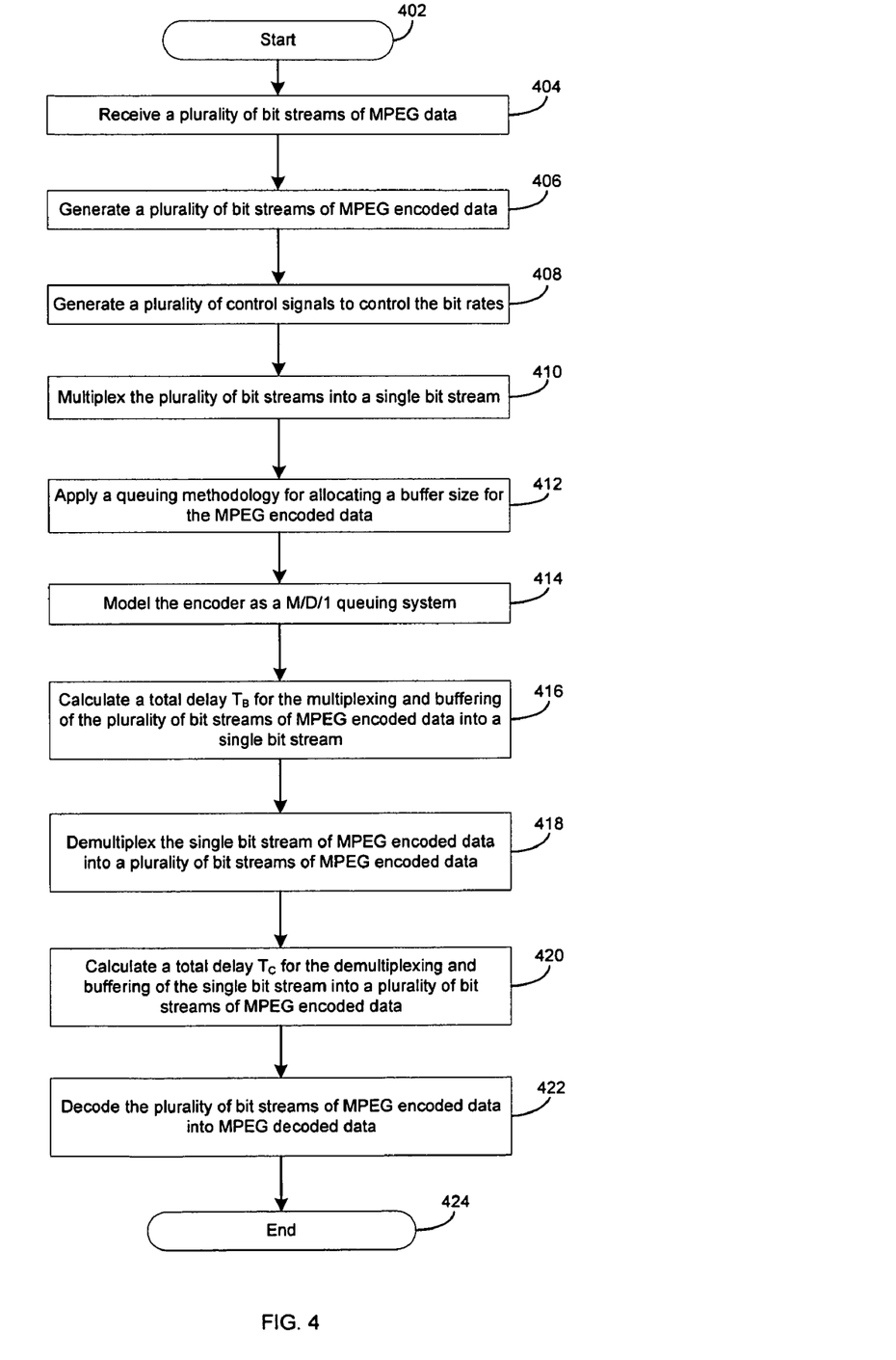
FIG. 4 is a flowchart illustrating exemplary steps for dynamic allocating video multiplexing buffer based on queuing theory, in accordance with an embodiment of the invention.

FIG. 4 is a flowchart illustrating exemplary steps for dynamically allocating video multiplexing buffer based on queuing theory, in accordance with an embodiment of the invention. Referring to FIG. 4, the exemplary steps may start at step 402. In step 404, a plurality of bit streams of MPEG data may be received. In step 406, the plurality of bit streams of MPEG encoded data may be generated. In step 408, a plurality of control signals may be generated to control a bit rate of the plurality of bit streams of the MPEG encoded data. In step 410, the plurality of bit streams of MPEG encoded data may be multiplexed into a single bit stream of MPEG encoded data.

In step 412, a queuing methodology may be applied for allocating a buffer size for the MPEG encoded data. In step 414, the multiplexing of the plurality of bit streams of the MPEG encoded data in the encoder may be modeled as a M/D/1 queuing system, where M denotes a Poisson arrival process, D denotes that a service time for each processing unit in a branch is deterministic and 1 denotes a single multiplexer. In step 416, a total delay for the multiplexing of the plurality of bit streams of the MPEG encoded data may be calculated as $$T_B = \frac{1}{\mu} + \frac{r/\mu^2}{2\left(1 - \frac{r}{\mu}\right)} = \frac{2\mu - r}{2\mu(\mu - r)}, r/\mu < 1,$$

where $T_B$ may be the total delay, μ may be a mean arrival rate of the plurality of bit streams of the MPEG encoded data, $r=r_1+r_2+\ldots+r_m$ bits/second may be a bit rate of the multiplexed single bit stream of the MPEG encoded data, $r_1, r_2 \ldots r_m$ bits/second may be bit rates of the plurality of bit streams of the MPEG data.

In step 418, the single bit stream of MPEG encoded data may be demultiplexed into a plurality of bit streams of MPEG encoded data. In step 420, a total delay for demultiplexing and decoding of the plurality of bit streams into MPEG decoded data in the decoder may be calculated as $$T_C = \frac{1}{R} + \frac{\frac{r_i}{r}*\mu*1/R^2}{2\left(1-\frac{r_i*\mu}{r*R}\right)} = \frac{1}{R} + \frac{r_i*\mu}{2R(rR-r_i\mu)}, r_i*\mu < R*r,$$

i=1 . . . m, where $T_C$ may be total delay, μ may be a mean arrival rate of the plurality of bit streams of MPEG encoded data, r=Σ$r_i$ bits/second may be a bit rate of the multiplexed single bit stream of MPEG encoded data, $r_i$ may be the bit rate of the plurality of bit streams of MPEG data, m may be number of input bit streams of MPEG data, $(r_i/r)*\mu$ bits/second may be a bit rate of the demultiplexed plurality of MPEG encoded data and R bits/second may be a bit rate of the decoded plurality of bit streams of MPEG encoded data. In step 422, the plurality of bit streams of MPEG encoded data may be decoded into MPEG decoded data. Control then passes to end step 424.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling data, the method comprising:
   multiplexing a plurality of MPEG encoded data bit streams into a single MPEG encoded bit stream; and
   determining, by one or more processors in an encoder, a buffer size of said encoder, wherein the buffer size of the encoder is based on each of:
   a bit rate of said single multiplexed MPEG encoded data bit stream,
   a calculated delay for multiplexing the plurality of said MPEG encoded data bit streams, and
   a mean arrival rate of the plurality of said MPEG encoded data bit streams.

2. The method according to claim 1, comprising generating said plurality of MPEG encoded data bit streams based on a received plurality of MPEG data bit streams.

3. The method according to claim 1, comprising controlling a bit rate of said plurality of MPEG encoded data bit streams via a plurality of control signals.

4. The method according to claim 1, comprising modeling said multiplexing of said plurality of MPEG encoded data bit streams as a M/D/1 queuing system, where M denotes a Poisson arrival process, D denotes that a service time for each processing unit in a branch is deterministic and 1 denotes a single multiplexer.

5. The method according to claim 1, wherein said calculated delay, $T_B$, associated with said multiplexing of said plurality of MPEG encoded data bit streams is $$T_B = \frac{1}{\mu} + \frac{r/\mu^2}{2\left(1-\frac{r}{\mu}\right)} = \frac{2\mu - r}{2\mu(\mu-r)}, r/\mu < 1,$$

where μ is said mean arrival rate of said plurality of MPEG encoded data bit streams, r=$r_1$+$r_2$+ . . . +$r_m$ is said bit rate of said single multiplexed MPEG encoded data bit stream and $r_1$, $r_2$ . . . $r_m$ are bit rates of each of a plurality of received MPEG data bit streams.

6. The method according to claim 1, comprising demultiplexing said single MPEG encoded multiplexed MPEG encoded data bit stream into said plurality of MPEG encoded data bit streams.

7. A method for handling data, the method comprising:
   demultiplexing a single MPEG encoded data bit stream into a plurality of bit streams of MPEG encoded data; and
   determining, by one or more processors in an encoder, a buffer size of said decoder, wherein the buffer size of the decoder is based on each of:
   a bit rate of said single multiplexed MPEG encoded data bit stream,
   a calculated delay associated with demultiplexing of the single multiplexed MPEG encoded data bit stream, and
   a mean arrival rate of the plurality of said MPEG encoded data bit streams.

8. The method according to claim 7, comprising decoding a plurality of said MPEG encoded data bit streams into a plurality of MPEG decoded data bit streams.

9. The method according to claim 8, comprising calculating a total delay, $T_C$, for said demultiplexing and said decoding of said plurality of MPEG decoded data bit streams as $$T_C = \frac{1}{R} + \frac{\frac{r_i}{r}*\mu*1/R^2}{2\left(1-\frac{r_i*\mu}{r*R}\right)} = \frac{1}{R} + \frac{r_i*\mu}{2R(rR-r_i\mu)}, r_i*\mu < R*r, i=1 \ldots m,$$

where μ is said mean arrival rate of said plurality of MPEG encoded data bit streams, r=Σ$r_i$ is said bit rate of said single multiplexed MPEG encoded data bit stream, $r_i$ is said bit rate of each of a plurality of received MPEG data bit streams, m is number of input said MPEG data bit streams, $(r_i/r)*\mu$ is a bit rate of said demultiplexed said plurality of MPEG encoded data bit streams and R is a bit rate of said decoded said plurality of MPEG encoded data bit streams.

10. A non-transitory machine-readable storage having stored thereon, a computer program having at least one code section for handling data, the at least one code section being executable by a machine for causing the machine to perform steps comprising:
   determining a buffer size of an encoder, wherein the buffer size of the encoder is based on each of:
      a bit rate of a single multiplexed MPEG encoded data bit stream, and
      a mean arrival rate of a plurality of MPEG encoded data bit streams, wherein the bit rate of the single multiplexed MPEG encoded bit stream is less than the mean arrival rate of the plurality of MPEG encoded data bit streams.

11. The non-transitory machine-readable storage according to claim 10, wherein said at least one code section comprises code for generating said plurality of MPEG encoded data bit streams based on a received plurality of MPEG data bit streams.

12. The non-transitory machine-readable storage according to claim 10, wherein said at least one code section comprises code for controlling a bit rate of said plurality of MPEG encoded data bit streams via a plurality of control signals.

13. The non-transitory machine-readable storage according to claim 10, wherein said at least one code section comprises code for modeling said multiplexing of said plurality of MPEG encoded data bit streams as a M/D/1 queuing system, where M denotes a Poisson arrival process, D denotes that a service time for each processing unit in a branch is deterministic and 1 denotes a single multiplexer.

14. The non-transitory machine-readable storage according to claim 10, wherein said calculated delay, $T_B$, associated with said multiplexing of said plurality of MPEG encoded data bit streams is $$T_B = \frac{1}{\mu} + \frac{r/\mu^2}{2\left(1 - \frac{r}{\mu}\right)} = \frac{2\mu - r}{2\mu(\mu - r)}, r/\mu < 1,$$

where $\mu$ is said mean arrival rate of said plurality of MPEG encoded data bit streams, $r = r_1 + r_2 + \ldots + r_m$ is said bit rate of said single multiplexed MPEG encoded data bit stream and $r_1, r_2 \ldots r_m$ are bit rates of each of a plurality of received MPEG data bit streams.

15. The non-transitory machine-readable storage according to claim 10, wherein said at least one code section comprises code for demultiplexing said single multiplexed MPEG encoded data bit stream into said plurality of MPEG encoded data bit streams.

16. A non-transitory machine-readable storage having stored thereon, a computer program having at least one code section for handling data, the at least one code section being executable by a machine for causing the machine to perform steps comprising:
   determining a buffer size of a decoder, wherein the buffer size of the decoder is based on each of:
      a bit rate of a single multiplexed MPEG encoded data bit stream, and
      a mean arrival rate of a plurality of MPEG encoded data bit streams.

17. The non-transitory machine-readable storage according to claim 16, wherein said at least one code section comprises code for decoding a plurality of said MPEG encoded data bit streams into a plurality of MPEG decoded data bit streams.

18. The non-transitory machine-readable storage according to claim 17, wherein said at least one code section comprises code for calculating a total delay, $T_c$, for said demultiplexing and said decoding of said plurality of MPEG decoded data bit streams as $$T_C = \frac{1}{R} + \frac{\frac{r_i}{r} * \mu * 1/R^2}{2\left(1 - \frac{r_i * \mu}{r * R}\right)} = \frac{1}{R} + \frac{r_i * \mu}{2R(rR - r_i\mu)}, r_i * \mu < R * r, i = 1 \ldots m,$$

where $\mu$ is said mean arrival rate of said plurality of MPEG encoded data bit streams, $r = \Sigma r_i$ is said bit rate of said single multiplexed MPEG encoded data bit stream, $r_i$ is said bit rate of each of a plurality of received MPEG data bit streams, m is number of input said MPEG data bit streams, $(r_i/r)*\mu$ is a bit rate of said demultiplexed said plurality of MPEG encoded data bit streams and R is a bit rate of said decoded said plurality of MPEG encoded data bit streams.

19. A system for handling data, the system comprising:
   one or more circuits for use in an encoder said one or more circuits being operable to determine a buffer size of said encoder, wherein the buffer size of the encoder is based on each of:
      a bit rate of a single multiplexed MPEG encoded data bit stream,
      calculated delay associated with multiplexing a plurality of MPEG encoded data bit streams into the single multiplexed MPEG encoded data bit stream, and
      a mean arrival rate of the plurality of MPEG encoded data bit streams.

20. The system according to claim 19, wherein said one or more circuits is operable to generate said plurality of MPEG encoded data bit streams based on a received plurality of MPEG data bit streams.

21. The system according to claim 19, wherein said one or more circuits is operable to control a bit rate of said plurality of MPEG encoded data bit streams via a plurality of control signals.

22. The system according to claim 19, wherein said one or more circuits is operable to model said multiplexing of said plurality of MPEG encoded data bit streams as a M/D/1 queuing system, where M denotes a Poisson arrival process, D denotes that a service time for each processing unit in a branch is deterministic and 1 denotes a single multiplexer.

23. The system according to claim 19, wherein said calculated delay, $T_B$, associated with said multiplexing of said plurality of MPEG encoded data bit streams is $$T_B = \frac{1}{\mu} + \frac{\frac{r}{\mu^2}}{2\left(1 - \frac{r}{\mu}\right)} = \frac{2\mu - r}{2\mu(\mu - r)}, r/\mu < 1,$$

where $\mu$ is said mean arrival rate of said plurality of MPEG encoded data bit streams, $r = r_1 + r_2 + \ldots + r_m$ is said bit rate of said single multiplexed MPEG encoded data bit stream and $r_1, r_2 \ldots r_m$ are bit rates of each of a plurality of received MPEG data bit streams.

24. The system according to claim 19, wherein said one or more circuits is operable to demultiplex said single multiplexed MPEG encoded data bit stream into said plurality of MPEG encoded data bit streams.

25. A system for handling data, the system comprising:

one or more circuits for use in a decoder that is modeled as a queuing system, said one or more circuits being operable to determine a buffer size of said decoder, wherein the buffer size of the decoder is based on each of:

a bit rate of a single multiplexed MPEG encoded data bit stream, a calculated delay associated with demultiplexing of the single multiplexed MPEG encoded data bit stream, and a mean arrival rate of the plurality of MPEG encoded data bit streams.

26. The system according to claim 25, wherein said one or more circuits is operable to decode a plurality of said MPEG encoded data bit streams into a plurality of MPEG decoded data bit streams.

27. The system according to claim 26, wherein said one or more circuits is operable to calculate a total delay, $T_c$, for said demultiplexing and said decoding of said plurality of MPEG decoded data bit streams as $$T_C = \frac{1}{R} + \frac{\frac{r_i}{r}*\mu*1/R^2}{2\left(1-\frac{r_i*\mu}{r*R}\right)} = \frac{1}{R} + \frac{r_i*\mu}{2R(rR-r_i\mu)}, r_i*\mu < R*r, \quad i = 1 \ldots m,$$

where $\mu$ is said mean arrival rate of said plurality of MPEG encoded data bit streams, $r=\Sigma r_i$ is said bit rate of said single multiplexed MPEG encoded data bit stream, $r_i$ is said bit rate of each of a plurality of received MPEG data bit streams, m is number of input said MPEG data bit streams, $(r_i/r)*\mu$ is a bit rate of said demultiplexed said plurality of MPEG encoded data bit streams and R is a bit rate of said decoded said plurality of MPEG encoded data bit streams.

* * * * *